United States Patent [19]

Bendig et al.

[11] Patent Number: 4,487,599
[45] Date of Patent: Dec. 11, 1984

[54] METHOD AND DEVICE FOR PRODUCING INTERLOCKED STACKS OF BAGS MADE OF HOSE-LIKE THERMOPLASTIC FOIL

[76] Inventors: Franz Bendig; Johannes Bendig, both of Talstrasse 72, 4018 Langenfeld, Fed. Rep. of Germany

[21] Appl. No.: 479,703

[22] Filed: Mar. 28, 1983

[30] Foreign Application Priority Data

Mar. 26, 1982 [DE] Fed. Rep. of Germany ....... 3211217

[51] Int. Cl.³ ............................................ B31B 23/02
[52] U.S. Cl. .................................... 493/194; 156/251; 156/264; 156/510; 156/512; 156/515; 156/556; 156/563; 493/204
[58] Field of Search ............... 156/290, 299, 510, 512, 156/515, 556, 558, 563; 493/203, 204, 194–202; 383/37; 206/526, 554

[56] References Cited

U.S. PATENT DOCUMENTS

| | | | |
|---|---|---|---|
| 3,893,382 | 7/1975 | Bosse et al. | 493/194 |
| 4,083,747 | 4/1978 | Rochla | 493/201 X |
| 4,128,049 | 12/1978 | Lehmacher | 493/194 |
| 4,395,252 | 7/1983 | Lehmacher | 493/196 X |

Primary Examiner—David Simmons
Attorney, Agent, or Firm—Michael J. Striker

[57] ABSTRACT

A continuous web in the form of a hose-like thermoplastic foil is intermittently fed through a welding and severing station in which two transverse weld seams on the foil are made and simultaneously a cutting blade severs a completed bag along a line between the weld seams. A transfer unit arranged immediately below the welding station temporarily seizes the severed bag, displaces the same a small distance in feeding direction, and then dashes the rear portion with the still plastic weld seam against an alignment line of a stacking station. The stacking station is arranged a small distance below the welding station at the other side of the severed bag, and the still plastic weld seam fuses with the corresponding weld seam of the preceding bag interlocked in the stack. The completed stack is discharged in a perforating station where the tearing line is perforated simultaneously through all stacked bags. If desired, additional holes are punched between the upper edge of the bag and the perforation line.

25 Claims, 13 Drawing Figures

METHOD AND DEVICE FOR PRODUCING INTERLOCKED STACKS OF BAGS MADE OF HOSE-LIKE THERMOPLASTIC FOIL

BACKGROUND OF THE INVENTION

The present invention relates in general to a method of and a device for producing bags and the like of a continuous thermoplastic foil shaped in the form of a hose or a partial hose. In particular, this invention relates to manufacturing methods and devices in which the hose-like foil is intermittently advanced and through a welding and cutting station where the interlocking and bottom seams are produced and simultaneously the completed individual bags are severed from the foil web. Thereafter, the welded bags are stacked along an aligning line on pins arranged in close proximity to the welding and cutting station.

From the German DE-AS No. 21 41 045, a manufacturing method is known in which, in order to provide a stack of bags or the like envelopes, which are interlocked by welding along one of their edges, the individual bags to be stacked are welded to the edge of the preceding bag by a separate welding step. For this purpose, the welding beams have a downwardly extended part serving as a stacking station. The rear side of this part, which is adverse to the welding surface, cooperates with a bag clamping bar, whereby the formed stack of bags is held between the welding beam and the clamping bar. The welding beam on the side thereof which faces the bag clamping bar is provided with welding means for producing the interlocking seam on the bag. In the stacking process, the upper part of each bag has been banded by means of an air nozzle from the front edge of the welding beam to the rear side thereof.

In further developments known for example from DE-OS No. 22 54 448 and DE-GM No. 74 34 007, the stacking station has been separated from the welding beam and is skewed in the direction of movement of the supply foil, a welding station, a cutting station, a stack interlocking station, and also a perforation station have been arranged in close sequence in this order. The tear-off perforation in the perforating station is not made in the completed stack. The aforementioned stations arranged closely one after the other define, depending on their spacing, also the distance of the bottom weld seam of each bag and the interlocking weld seam with the preceding bag on the stack, as well as the distance of the tearing perforation line the assigned parallel edge of the bag. Inasmuch as the clearance between these individual stations for welding, cutting, interlocking and perforating operations cannot fall below a limit value determined from the resistance to a displacement as well as in view of the installation of necessary driving elements and because of overheating protection of insulating layers arranged therebetween, the bags produced in this prior-art device has weld seams and perforation lines which are spaced a relatively long distance from the assigned parallel edges of the bag. As a result, a relatively large percentage of foil material is wasted.

In addition, due to the fact that the above stations employ separate welding devices for the bottom weld seams of the bags and for the interlocking weld seams, separate connections to the heating elements of the welding devices are necessary, which must be controlled to produce different welding temperatures. Consequently, the construction cost is increased.

SUMMARY OF THE INVENTION

It is therefore a general object of the present invention to overcome the aforementioned disadvantages.

More particularly, it is an object of the invention to provide an improved method and device for manufacturing plastic bags and the like which upon their completion in the seam welding device are immediately transferred and interlocked to a stack which is being built up in a setting station arranged close to the welding station.

Another object of this invention is to provide a stacking method and device which are simple in construction and is suitable for handling even very thin-walled bags with the minimum loss of foil material.

In keeping with these objects, and others which will become apparent hereafter, one feature of the invention resides, in a method of manufacturing bags and the like envelopes of a thermoplastic foil of a hose-like configuration, the steps of forming in one processing stage two parallel weld seams extending transversely to the feeding direction of the foil and simultaneously severing the resulting bags from the rest of the foil between the two transverse seams, then transferring the bag in feeding direction against a stack-aligning line in a stacking station which is arranged in close proximity to the welding station, the length of transfer being within the distance of the stacking aligning line from the welding device for the interlocking weld seam and then moving in transverse direction the severed bag against the stack aligning line and then joining the interlocking seam closely above the aligning line to the interlocking seam of the preceding bag held in stacks in the stacking station.

In one elaboration of this invention, the aligning line in the stacking station is provided with holding pins which pierce the severed bag tightly below the interlocking seam, and thereupon the still plastic seam is joined to the preceding interlocking seam. In contrast to prior-art solutions where immediately upon the severing of the completed bag from the supply foil the bag was immediately moved in transverse direction to the stacking station, the solution of this invention where the bag is first displaced a small interval in feeding direction prior to its displacement in transverse direction, makes it possible to selectively adjust the length of this interval downstream of the welding station to optimum processing conditions determined by the used material and size of the bags. Inasmuch as the clearance between the top edge of each bag and the apertures pierced by the stack supporting pins is now determined by the rate of displacement of the completed bag and not by the spatial arrangement of the welding and stacking stations, the distance of the pierced holes in the stack alignment line from the interlocking seam or from the upper edge of each bag can be readily adjusted with great accuracy and this distance can be now kept at a minimum.

As mentioned before, another substantial advantage of the method of this invention is the fact that heat used for producing the interlocking weld seam in the welding station can be still utilized after the displacement of the severed bag in the feeding direction for joining the interlocking seam to that of the preceding bag in the stack. By virtue of this invention it is therefore no longer necessary to provide an additional welding device in the stacking station which is spaced apart from the manufacturing welding station.

In a modification of this invention, simultaneously with the provision of the bottom weld seam in the foil web, the severing step is carried out by means of a heated welding wedge which simultaneously with the separation of the leading bag produces the bottom weld seam for the incoming next bag. The weld seam produced upstream of the heated severing wedge in this case serves as the interlocking weld seam which is applied against a corresponding interlocking weld seam in the preceding bag hanging the stacking station. In this embodiment, heat generated in the manufacturing station for the production of bottom seams of the bag is utilized in the subsequent stacking station for interlocking the stack.

The solution according to this invention is thus independent from the kind and function of the seams in the manufacturing station.

In still another modification, it is possible to use a separate weld seam for the creation of the bottom of the bag and another weld seam for interlocking the bags in the stacking station. The configuration of the latter seams can be different from the bottom weld seams, for example they do not need to extend over the entire width of the bag. It is also possible to produce the interlocking seams in the welding device in the manufacturing station by punctiform spot welding and make use of this punctiform weld seam in the subsequent stacking station. In summary, the essence of this invention is to produce all weld seams in a common welding device in the bag manufacturing station while the utilization of the interlocking weld seams is made in a separately arranged stacking station. In this manner, a considerable simplification of the machinery needed for the production of bags will result, paticularly in view of the simplified construction of heat insulating and electrically insulating components.

Of particularly advantage is the solution in which the intermittently advanced foil web is severed by a separation device and two weld seams are produced by discrete welding devices arranged in close proximity upstream and downstream of the separation device. The first-mentioned (upstream) welding device serves for closing the bottom part of the subsequent bag, and the second (downstream) welding device produces a weld seam for the attachment of the upper end of the severed bag after its displacement about its full length in the feeding direction to the level of the stack aligning line in the stacking station. The invention makes it possible to provide in a single operational step and with a single work tool a double weld seam with an intermediate severing cut, whereupon the leading weld seam when viewed in the direction of feeding serves for joining or interlocking the severed bag to a stack formed in a separate stacking station, and the trailing seam serves as a bottom of the subsequent bag to be severed.

In a modification of the above embodiment of this invention, the two welding devices before and after the severing device act on the hose-like foil from both sides of the latter. Even if this measure is known in producing a bottom weld seam in bags produced from two plies of a foil, it is new with respect to the production of seams for interlocking stacks of the bags. This solution is particularly advantageous inasmuch as still heated interlocking seam on one side of the bag is applied against a still heated interlocking seam on the opposite side of the severed bag hanging on the stacking pins in the stacking station. By virtue of the two juxtaposed interlocking weld seams, the joining of the bags in the stack is improved.

In still another embodiment of this invention the welding device in the bag manufacturing station includes two opposite welding beams of which one houses a reciprocating cutting blade engageable with a corresponding groove in the opposite welding beam.

Preferably, in the above embodiment each of the welding beams is provided on its facing surfaces with a high-quality heat-insulating coating made for instance of a glass fiber mat, and each supporting upstream and downstream of the cutting blade and of the opposite cutting grooves a heating band acting as the actual welding elements. In the preferred embodiment, the cutting blade assigned to one of the welding beams is in the form of a blade mounted on a circulating serrated belt. The groove in the opposite welding beam is provided with guides of a plastic material for guiding the cutting blade driven by the belt.

According to still another feature of this invention the device for transferring the severed bag in its longitudinal direction and for striking the trailing edge of the severed bag in transverse direction against the stacking pins in the stacking station, includes a rotary transfer body rotating about an axis extending transversely to the feeding direction of the severed bag opposite the stacking device. Preferably, the rotary body is provided with a suction device for engaging the severed bag. In a variation of the transfer member, there is provided a circulating conveying band cooperating with a plurality of suction devices. One run of the conveying band moves parallel to the feeding direction of the severed bag opposite the stack and its position is adjustable relative to the latter. In the preferred embodiment, however, the rotary transfer body rotates about an axis and is provided with an auxiliary member whose distance to the fixed axis of rotation of the member is continuously changed during each cycle. The rotary transfer body rotates preferably about a hollow axle which is connected to a suction device and communicates with a suction surface of the member. The auxiliary variable distance member is preferably in the form of a leaf spring extending over the entire length of the rotary member parallel to the discharged bag and cooperates with a biasing circular sector open against the severed bag in such a manner as to release the biased leaf spring when the trailing edge of the bag is opposite to the stacking pins. The leaf spring during subsequent rotation of the rotary member is bent again by the circular segment and advanced in biased condition until it is released at the open edge of the segment.

Downstream of the rotary transfer body, there is provided, according to another feature of this invention, a folding device including a swirl-like member movable against the stack of bags suspended in the stacking device to push the stack along a folding line against a conveying roller on a discharging table.

According to still another feature of this invention, the discharging table is provided with a perforating or hole-punching device.

If desired, the solution according to this invention can be also used in devices where the hose-like web or foil is advanced and the completed bags are stacked in horizontal direction. Nevertheless, the advantages of this invention will be most appreciated in manufacturing and stacking the bags in vertical direction when a very thin-walled foil is used and correspondingly flexible bags are produced.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
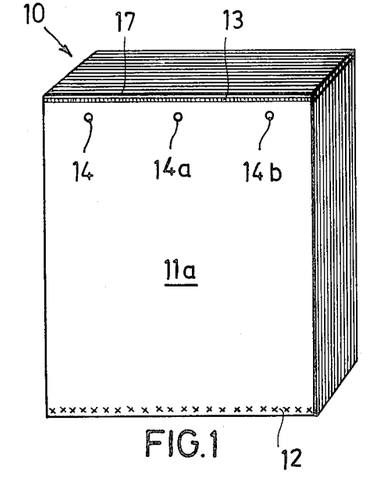
FIG. 1 is a perspective view of an interlocked stack of plastic bags produced in the stacking station in the device of this invention.
Figure 2:
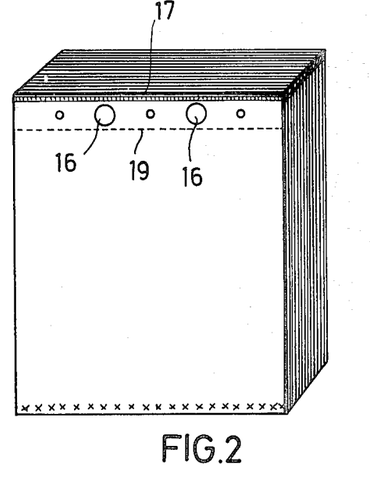
FIG. 2 is the stack of FIG. 1 completed with perforations and holes during further processing.

FIGS. 1 and 2 show an interlocked block or stack 10 of plastic bags 11a each being individually closed at its lower edge with a bottom weld seam 12. At the upper edge, each of the bags is joined to the next one by means of an interlocking weld seam 13. Simultaneously with the stacking, the individual bags 11a are dashed against stacking pins which pierce holes 14, 14a and 14b immediately below the interlocking weld seam 13. After a stack of bags 11a is completed in the stacking device (FIG. 1), it is discharged from the latter and in further processing steps tearing perforation 15 is produced simultaneously on all bags in the interlocked stack immediately below the holes 14-14b. The perforation line thus represents the filling opening of the individual bags. If desired, larger holes 16 are punched in the strip between the interlocking weld seam 13 and the tearing perforation line 15 for suspending the completed stack on supporting pins.

It will be seen from FIG. 2 that the stack portion between the perforated tearing line 15 and the top edge 17 of the stack is a waste, and therefore it should be kept as small as possible. In conventional devices for manufacturing and stacking interlocked blocks of bags, the distance of the perforation line 15 to the upper edge 17 cannot be arbitrarily adjusted, inasmuch as this distance is determined by the invariable size of components parts of the manufacturing and stacking devices. For example, in conventional devices of this kind, the interlocking weld seam 13 is spaced apart by a relatively large distance from the upper edge 17 of the bag, and also the pinholes 14, 14a and 14b are spaced apart by a relatively large fixed distance from the weld seam 13.

As will be explained below, the invention makes it possible to adjust the clearance between the interlocking weld seam 13 and the upper edge 17 of the stack, and also the clearance between the pinholes 14-14b and the perforated tearing line 15 is adjustable and can be kept at a minimum.

FIGS. 3-6 show in principle the operational steps in the welding and stacking stations in the device of this invention.

Figure 3:
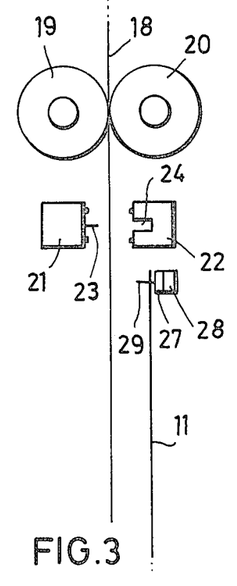
FIGS. 3-6 show schematically the processing steps for producing the stack of FIG. 1.
Figure 4:
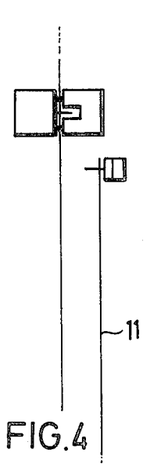
Figure 5:
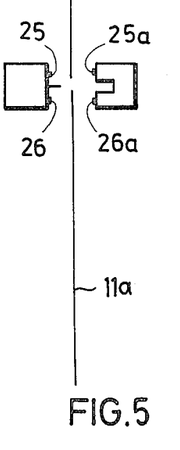

As seen from FIG. 3, a continuous hose-like web 18 of thermoplastic foil is fed in vertical direction between advancing rollers 19 and 20 which intermittently advance the foil about a distance corresponding to the desired length of the finished bag 11. The length of the hose-like foil 18 below the rollers 19 and 20 passes between welding beams 21 and 22 provided respectively with upper welding elements 25 and 25a, a cutting blade 23 with opposite cutting groove 24 and the lower welding elements 26 and 26a. Immediately below the welding beam 22 there is provided a stacking station consisting of a stop bar 27 and a pin bar 28 supporting stacking pins 29 arranged along an alignment line of the stack. A bag 11 is suspended on the pins 29. As illustrated in FIG. 4, the welding beams 21 and 22 move against each other, whereby the upper welding elements 25 and 25a produce the bottom weld seam 12 in the hose-like foil 18 and simultaneously the lower welding elements 26 and 26a produce the interlocking seam 13, while the cutting blades 23 severs the bag 11a between the two welding seams 12 and 13. The distance of the opposite welding elements to the cutting blade can be adjusted according to the used thermoplastic material and thus the clearance between the upper edge and the weld seams can be made minimum. In the next step shown in FIG. 5, the welding beams 21 and 22 return to their open position and the bag 11a with still plastic interlocking weld seam 13 is displaced a small distance X (FIG. 6) in feeding direction substantially to the level of stacking pins 29, whereupon, as will be described below, the upper end portion of the bag 11a is dashed in transverse direction against the pins 29 and the still plastic interlocking seam 13 is joined to the corresponding seam of the preceding bag suspended in the stack. The short interval X is related to the spatial arrangement of the stacking pins 29 to the cutting blades 23. It is also possible to select another reference point for determining the length of the travel of the severed bag 11a. For example, the distance Y between the lower welding elements 26 and 26a and the stacking pins 29 determines the moment of application of the bag 11a to the stack. In manufacturing the stacks of bags it is desirable that the interlocking seam 13 produced on individual bags by the lower welding means 26 and 26a be positioned closely above the stacking pins 29 in order to prevent waste of material. Accordingly, the length Y of displacement of the severed bag is slightly less than the clearance between the alignment line of the pins 29 from the lower welding device.

Figure 6:
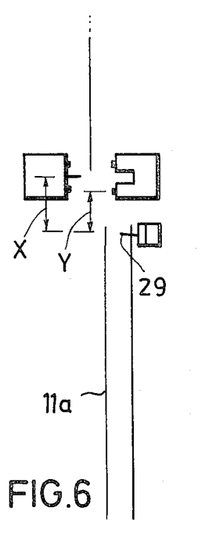

After the joining of the interlocking seam 13 against the corresponding seam of the stacked bags, the advancing rollers 19 and 20 feed the hose-like foil 18 with its bottom edge closed by the bottom seam 12 about the full length of the bag and the process is repeated.

Figure 7:
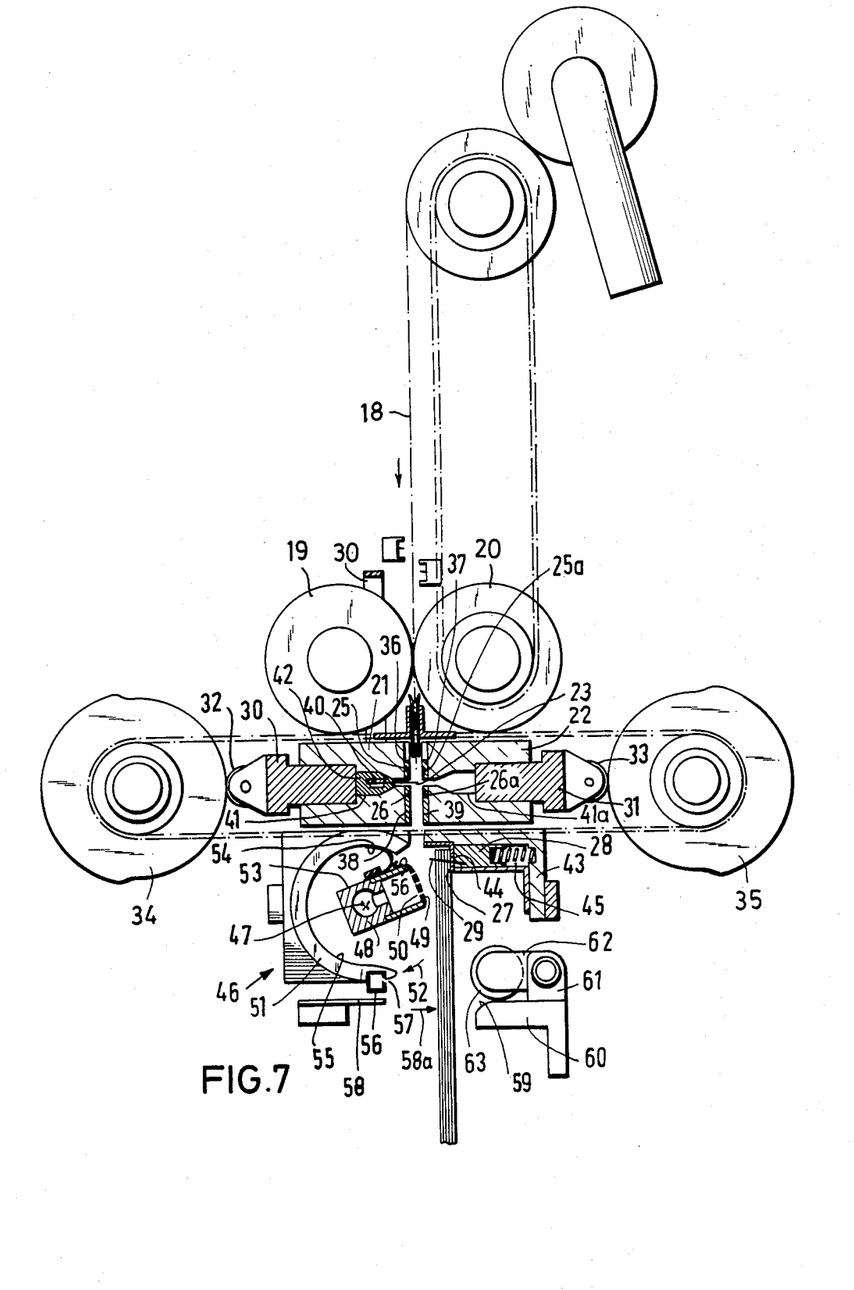
FIG. 7 is a sectional side view of one embodiment of the device for manufacturing and stacking plastic bags in vertical direction.

FIG. 7 illustrates in greater detail the arrangement of manufacturing, stacking and discharging stations in the device of this invention. The hose-like web 18 of the plastic foil is intermittently advanced between the welding beams 21 and 22, which are mirror-symmetrically arranged at an equal distance from the foil 18. Each welding beam is connected with an assigned ramming member 30 and 31. The free end of each ramming member is provided with a cam follower in the form of rollers 32 and 33 engaging the surface of rotary driving cams 34 and 35. The facing end surfaces of welding beams 21 and 22 are coated with insulating layers of a high-quality heat-resistant material made for example of glass fibers. The heat-insulating layers are in the form of insulating strips 36 and 37 above the cutting blade 23 and strips 38 and 39 below the cutting knife. The facing insulating strips in each pair support welding bands 25, 25a and 26, 26a. As explained before, the upper welding bands 25, 25a constitute the welding elements for the bottom weld seam 12 and the lower elements 26 and 26a constitute the welding elements for the interlocking weld seam 13. The cutting blade 23 is arranged on a serrated belt 40 passing through an extended groove 41 in the left-hand welding beam 21. A corresponding extended groove 41a is formed also in the opposite welding beam 22. Each of the welding beams is assembled of two pieces arranged one above the other and interconnected by fastening means.

The stacking station is arranged immediately below the welding station when viewed in feeding direction of the web. The stacking station consists of a bracket 43 which at its end facing the path of movement of the bags is provided with a stationary stop bar 27. Stacking pins 29 project through corresponding openings in the stop bar 27 and are attached to a slidably supported pin holder 28. A helical spring 45 biases the pin holder 28 against the rear side of the stop bar 44. A non-illustrated correction means displaces the pin holder 28 with the stacking pins 29 in the direction against the biasing spring 45 when a sufficient number of bags has been attached to the stack and the interlocked stack is thus discharged.

A transfer unit 46 is arranged immediately below the left-hand welding beam 21 opposite the supporting bracket 43. The transfer unit 46 includes an elongated rotary member 48 extending parallel to the major surface of the severed bag and being supported for rotation on a hollow axle 47. The rotary member 48 has an arched end surface 49 which is provided with a plurality of suction openings 50 communicating via the hollow axle 47 with a non-illustrated suction device. The resulting underpressure in the openings 50 causes the severed bag to be momentarily seized by the arched surface 49 and advanced the short distance Y away from the welding station. The axle 47 is located at the center of a semicircular shell or trough 51 opening against the path of movement of the severed bags. The rotary suction bar 48 is provided on its trailing side 52 when viewed in the rotary direction with a leaf spring 54 which upon engagement with the inner wall 55 of the trough 51 is bent into its biased condition. As will be explained in more detail below, when the leaf spring disengages the inner wall of the trough 51 at the edge of the upper end of the latter, it strikes laterally against the upper end of the severed bag and dashes the same against the stacking pins 29. An abutment rail 56 is mounted on the wall 53 of the rotary member to provide a limit stop for the movement of the leaf spring.

Figure 9:
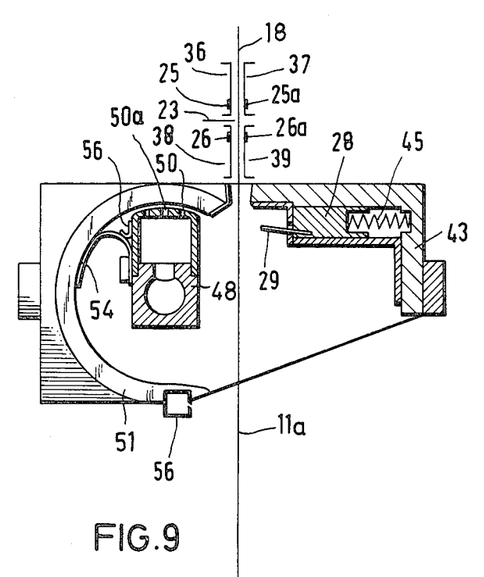
FIGS. 9-11 show the operational steps of the bag transferring device between the manufacturing station and the stacking station.
Figure 10:
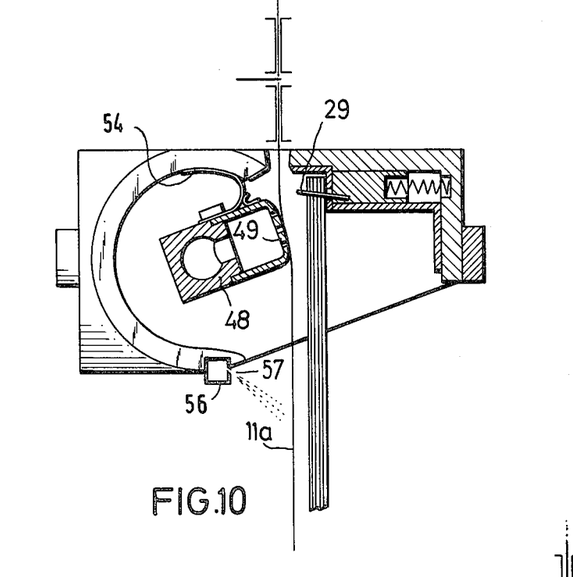
Figure 11:
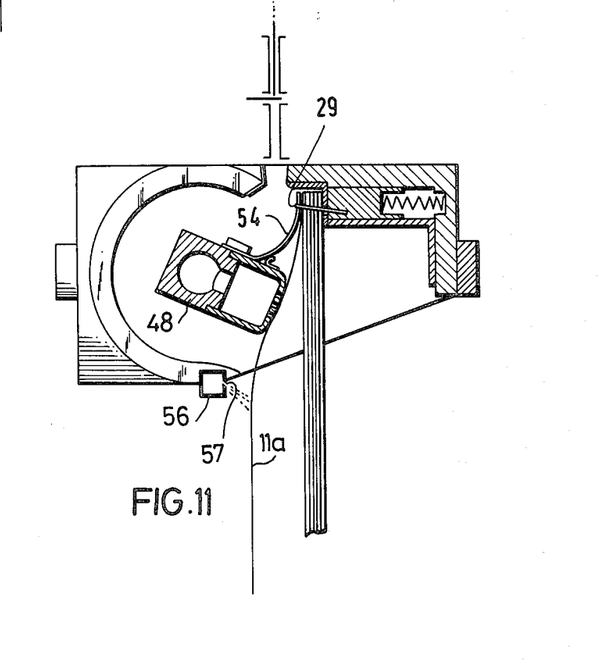

FIGS. 9-11 illustrate in detail the operation of the rotary suction bar 48 for transferring the severed bags from the loading station to the stacking station.

FIG. 9 shows the rotary suction member 48 in a position immediately before the bag 11a is severed by the blade 23 from the hose-like web 18. The rotary suction bar 48 with its biased leaf spring 54 is still within the confines of the trough 51. As soon as the bag 11a is severed and the weld seams are made (FIG. 10), the suction surface 49 of the rotary member 48 engages the major surface of the bag 11a while the welding beams hold for a short instant its upper end in the clamped position and the leaf spring 54 approaches the upper edge of the trough 51. At the moment when the welding beams release the bag the leaf spring 54 disengages the inner surface of the trough and resiliently strikes the upper end of the severed bag 11a against the stacking pins 29 as seen from FIG. 11. At this moment, the suction of the rotary member 48 is interrupted and the stacked bag 11a is completely released.

The lower edge of the biasing trough 51 is provided with an air exhaust pipe 56 with nozzles 57 directed against the lower surface of the severed bag 11a in such a manner as to blow off the bag against the stack suspended in the stacking station. The air jets emanating from the nozzles 57 at the same time cool down the bottom weld seam 12 so that the latter is solidified before its contact with the stack.

As soon as the desired amount of bags has been stacked, the intermittent operation of the advancing rollers 19 and 20 is interrupted, and preferably the rotation of the suction bar 48 is also stopped in the position shown in FIG. 9. Then the pin supporting bar 28 is retracted and simultaneously or a short time before this retraction, the folding swirl-like member is pushed in the direction of arrow 58a (FIG. 7) against the loosely suspended bags in the stack. The fold is thus displaced against the rounded edge 59 of a discharging table 60, and the upper fold 65 (FIG. 8) of the stack is engaged with a rotary roller 63 which is mounted on a rocking lever 62.

Figure 8:
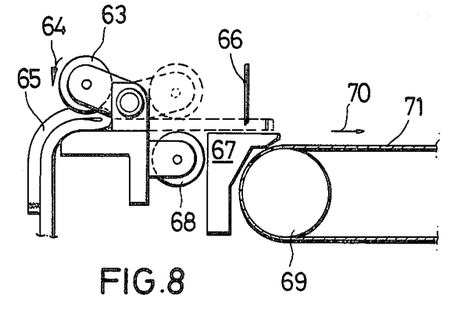
FIG. 8 is a schematic side view of a discharging table with devices for further processing the stack of FIG. 1.

It will be seen from FIG. 8 that the roller 63 rotates in the direction of arrow 64, whereby the upper fold 65 is displaced and stretched along the discharging table 60 as far as to a counterblock 67 in a perforating unit. In this stretched position, a perforating comb 66 is compressed against the stack as far as to the counterblock 67 to produce the tearing line 15 as shown in FIG. 2. If desired, the supporting holes 16 and 16a are also punched out in the stack. The intermediate part of the stretched stack rests on an idling roller 68 supported between the discharging table and the counterblock. After the bag stack is completed, the rocking lever 62 with the driving roller 63 is turned over in the position indicated by dashed lines in FIG. 8 to serve as a transport roller for discharging the whole stack on the upper run 71 of a conveyor 69 which advances the completed stack in the direction of a row 70.

Figure 12:
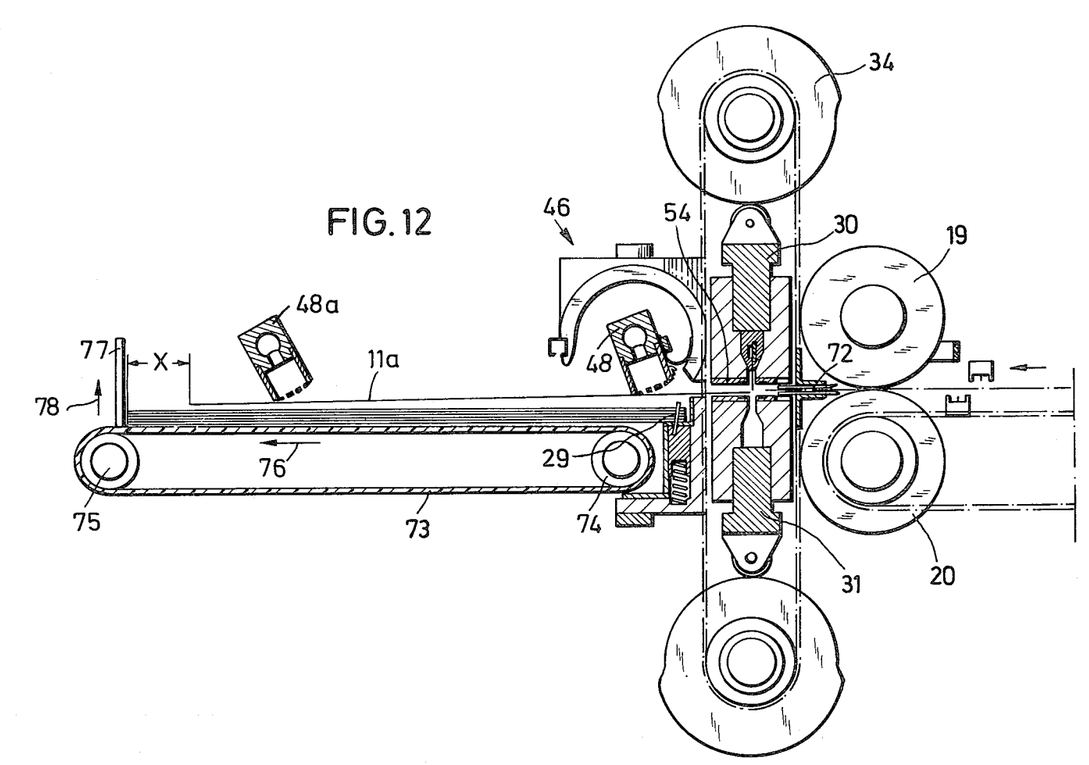
FIG. 12 is a sectional side view of another embodiment of the device of this invention in which the bags are manufactured and stacked in horizontal direction.

Referring now to FIG. 12, there is illustrated another embodiment of the device of this invention in which the hose-like web 18 and the deposition of completed bags on a stack is made in horizontal direction. In principle, all component parts used in the embodiment for vertical feeding and stacking (FIG. 7) are applicable also for the horizontal mode of operation. The feeding rollers 19 and 20 advance the hose-like foil through a guiding device 72 between the contracting welding beams driven by means of cam followers 30 and 31 where after the bottom weld seam and the interlocking weld seam are produced and the bag is severed by the cutting blade, and the transfer unit 46 withdraws the bag in feeding, in this case in horizontal, direction from the welding station and applies the bag on a horizontal stack. In this embodiment, the leading (bottom) end portion of the bag is assisted by an additional rotary suction bar 48a rotating in concert with the suction bar 48.

In contrast to the embodiment with vertical feeding, the horizontal stack in this embodiment is supported on a conveying band 73 supported on rollers 74 and 75. During the deposition of individual bags on the stack, the conveying belt 73 is motionless and the length of the web 18 corresponding to the desired length of the bag 11a is first advanced by means of the rollers 19 and 20 over a major part of the stack on the conveyor 73. After the separation of the bag 11a from the hose-like foil, the rotary suction bars 48 and 48a seize the bag and displace it in feeding direction about the short distance X, whereupon the biased spring 54 strikes the trailing end of the bag and applies it against the stacking pins 29 in the manner described in the preceding example.

When the stack on conveying belt 73 includes the full number of the individual bags, the stacking pins 29 are retracted a step bar 77 at the end of the stack is lifted in the direction of arrow 78, the conveying belt 73 is set into motion, and the stack is discharged in the direction of arrow 76.

The joining of the stacked bags along the interlocking weld seam is made possible by the fact that the welding strips 26 and 26a in the welding station apply sufficient heat to the weld seam that the material of the bag is still in plastic condition when the severed bag is displaced the short distance X and the still plastic interlocking seam is applied against the corresponding seam in the top bags in the stack. In this manner, any additional heating unit which hitherto has been used in the stacking unit for producing the interlocking seam can be dispensed with.

In the embodiment according to FIG. 12, the stacking pins 29 can be replaced by any suitable alignment device which would hold the bags in their stacking position. For example, the stop plate 77 can be used as an alignment device. Nevertheless, another a holding device for individual bags should replace the stacking pins at the trailing end of the bags.

Figure 13:
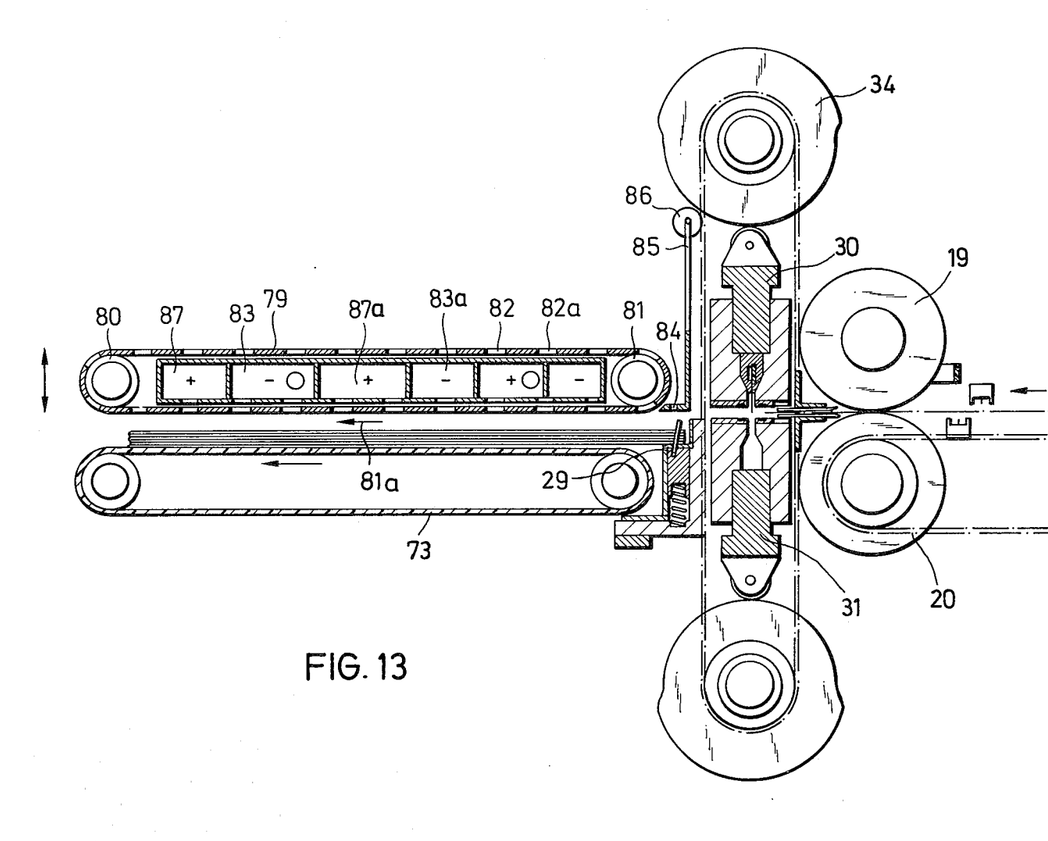
FIG. 13 is a modification of the device of FIG. 12, with bag transferring device in the form of a conveying belt.

FIG. 13 illustrates a modification of the horizontally fed device in which the rotary suction bars of FIG. 2 are replaced by a circulating band 79 driven by rollers 80 and 81 to move in the direction of arrow 81a. The band 79 is perforated and cooperates with a series of suction chambers 83 and 83a arranged between the runs of the perforated belt 79 opposite the stack on the belt 73. The circulating band 79 has the advantage that, due to the underpressure in the perforations 82 and 82a, the bag advanced by the rollers 19 and 20 can be seized immediately after its discharge from the welding station and advanced in the horizontal direction until its rear end portion is clamped by the welding beams. In this manner, the suction belt 79 can circulate continuously in spite of the fact that the advancing rollers 19 and 20 advance the web 18 intermittently. A cam-controlled depositer 84 is arranged for reciprocating movement between the welding station and the suction band 79. Preferably, the depositer is in the form of a bar provided with holes 84 matching the stacking pins 29 and is connected via a rod 85 to a cam follower 86 in the form of a roller engaging the driving cam 34. This arrangement guarantees that the synchronization of the welding and cutting operations with subsequent transfer of the severed bag and its deposition against the stacking pins is always carried out at exactly synchronized time intervals. After the bag is pierced by the stacking pins 29 or held in position by another holding device, then an overpressure is applied to chambers 87, 87a as indicated by a plus sign and the resulting air streams emanating from the holes 82, 82a in the band 79 separate the bag from the band and by the action of the pressure air are applied on the stack.

After the stacking of a sufficient number of bags, the lower conveyor 73 is activated, the pins 29 are retracted and the completed stack of the bags is discharged for a further processing.

It will be understood that each of the elements described above, or two or more together, may also find a useful application in other types of constructions differing from the types described above.

While the invention has been illustrated and described as embodied in specific examples of a device for manufacturing bags, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of producing stacks of interlocked bags and the like envelopes made of a hose-like foil of thermoplastic material, comprising the steps of intermittently advancing the foil through a welding and severing station where the foil is clamped, welded along two parallel weld seams and severed along a line between the weld seams; thereafter the foil is released in the welding station and the severed part with the still plastic weld seam is advanced a small distance in feeding direction against a stacking station where it is dashed in transverse direction against an alignment line where the still plastic weld seam is joined to the corresponding seam in the preceding bag.

2. A method as defined in claim 1, wherein the weld seams in the welding and cutting stations are heated from both sides of the hose-like foil in order to store in the seam a heat sufficient to maintain plastic condition of the outer seam on the stack to be fused with the inner seam portion of the applied bag.

3. A method as defined in claim 1, wherein the completed stacks are discharged from the stacking station and perforated along a tearing line.

4. A device for manufacturing bags and the like envelopes made of a hose-like foil of thermoplastic material, comprising means for advancing the foil in a feeding direction; a welding and severing station including a first welding device for producing a bottom weld seam in the foil, a second welding device for producing an interlocking weld seam extending parallel to and a small distance from the bottom weld seam, and a severing device for severing a completed bag between the two weld seams; a stacking station arranged a small distance downstream of the second welding device to hold the completed bags along an aligning line; and a transfer unit arranged for seizing the trailing end portion of the severed bag, advancing the bag a small distance in feeding direction within the range of the spacing of the alignment line from the second welding device and then dashing the severed bag in transverse direction against the aligning line so that the interlocking weld seam adjoins the corresponding seam of the preceding bag held in the stacking station.

5. A device as defined in claim 4, wherein each welding device in the welding and severing station includes two welding elements arranged opposite each other at both sides of the hose-like foil.

6. A device as defined in claim 5, wherein said welding and severing station includes two welding beams for supporting said welding devices, one of said beams being formed with a projecting cutting blade arranged between the welding elements and the other beam having a groove for receiving the cutting blade.

7. A device as defined in claim 6, wherein the facing surfaces of the two welding beams are provided respectively with two strips of a high-quality heat-insulating material, the strips being arranged above and below the cutting blade and the opposite groove for the cutting blade and each supporting a welding element in the form of a heated band.

8. A device as defined in claim 7, wherein each of the welding beams is formed with an extended groove, one of said extending grooves accommodating a circulating belt for supporting the cutting blade.

9. A device as defined in claim 4, wherein the transfer unit includes a rotary member which is supported for rotation about an axis extending transversely to the direction of movement of the severed bag, said rotary member including means for temporarily seizing the bag so as to advance it a short distance in the feeding direction, and means for displacing at least the trailing end portion of the bag transversely to the feeding direction against the stacking station.

10. A device as defined in claim 9, wherein said seizing means is a suction device.

11. A device as defined in claim 10, wherein said displacing means includes a surface portion whose distance to the axis of rotation of the rotary member is variable in response to the angular position of the rotary member.

12. A device as defined in claim 11, wherein said rotary member rotates about a hollow axle connectable at one end to a source of underpressure and communicating with perforations formed in one end face of the rotary member, said end face having a curved shape to act as the seizing means; and said displacing means including a leaf spring attached to a side surface of the rotary member and cooperating with biasing means which bend or release the spring in dependence on the angular position of the rotary member.

13. A device as defined in claim 12, wherein said biasing means is a stationary trough of a semi-circular cross section which is coaxially arranged about said rotary member and opening toward the path of movement of the severed bag, said leaf spring during the rotation of the rotary member being bent by the inner wall of the trough so that upon exit from the trough it resiliently dashes the bag against the stack in the stacking station.

14. A device as defined in claim 13, wherein said trough defines an upper edge and a lower edge, said lower edge being provided with an air exhaust pipe extending parallel to the path of movement of the severed bag and being provided with nozzles for directing air stream against the bag so as to blow the latter against the stack.

15. A device as defined in claim 4, wherein said stacking station includes a perforated stop bar extending along the alignment line of the stack a small distance from the welding and severing station, and a shiftable pin bar provided with pins passing through the perforations of the stop bar to pierce the rear end portions of the severed bags during their displacement by the displacing means.

16. A device as defined in claim 15, wherein said pins are slightly inclined upwardly.

17. A device as defined in claim 15, further including folding means arranged below said transfer unit, said folding means including a reciprocating sword-like member and a discharging table facing said sword-like member at the opposite side of the stack, said discharging table being provided with a driven roller for engaging the folded part of the stack after its displacement by the sword-like member.

18. A device as defined in claim 17, wherein said driven roller is mounted on a rocking lever.

19. A device as defined in claim 18, further including a perforating device adjoining said discharging table to produce a perforated tearing line in the stack.

20. A device as defined in claim 4, wherein said hose-like foil is fed in horizontal direction, said stacking station including a horizontal stack support extending below the path of movement of the severed bag, and said transferring means including an additional rotary member arranged above the path of movement of the severed bag to temporarily seize and displace the leading end portion of the severed bag.

21. A device as defined in claim 20, wherein said stack support is a conveyor band supported on two driven rollers.

22. A device as defined in claim 4, wherein said transferring device includes a perforated conveyor band extending parallel to the path of movement of the severed bag, the perforation of said band communicating with at least one underpressure chamber for temporarily seizing and displacing the severed bag.

23. A device as defined in claim 22, further including an overpressure chamber communicating with the perforation of the conveyor band for blowing off the severed bag against the stack.

24. A device as defined in claim 23, wherein said underpressure and overpressure chambers are arranged between the runs of the perforated conveyor band.

25. A device as defined in claim 24, further comprising a striking member arranged for reciprocating movement between the welding station and the perforated conveyor bands to deposit the rear end portion of the severed bag against the alignment line of the stack.

* * * * *